(12) United States Patent
Inose et al.

(10) Patent No.: US 11,339,901 B2
(45) Date of Patent: May 24, 2022

(54) THREADED CONNECTION FOR STEEL PIPES

(71) Applicants: Nippon Steel Corporation, Tokyo (JP); Vallourec Oil and Gas France, Aulnoye-Aymeries (FR)

(72) Inventors: Keita Inose, Tokyo (JP); Masaaki Sugino, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 99 days.

(21) Appl. No.: 16/613,598

(22) PCT Filed: Apr. 5, 2018

(86) PCT No.: PCT/JP2018/014616
§ 371 (c)(1),
(2) Date: Nov. 14, 2019

(87) PCT Pub. No.: WO2018/216366
PCT Pub. Date: Nov. 29, 2018

(65) Prior Publication Data
US 2020/0200304 A1    Jun. 25, 2020

(30) Foreign Application Priority Data

May 22, 2017 (JP) .............................. JP2017-101229

(51) Int. Cl.
*F16L 15/00* (2006.01)
(52) U.S. Cl.
CPC .................................. *F16L 15/004* (2013.01)
(58) Field of Classification Search
CPC ..... F16L 15/004; F16L 15/009; F16L 15/003; F16L 15/04; E21B 17/042
See application file for complete search history.

(56) References Cited

U.S. PATENT DOCUMENTS 2,992,019 A * 7/1961 Macarthur .......... E21B 17/0423
285/110
3,856,337 A * 12/1974 Ehm ..................... F16L 15/004
285/334
(Continued)

FOREIGN PATENT DOCUMENTS

CA        2862833 A1 *   7/2013    ............ F16L 15/004
CA        2977306 A1 *   8/2016    .............. F16L 15/00
(Continued)

OTHER PUBLICATIONS

English Abstract of WO2012056500.
(Continued)

*Primary Examiner* — David Bochna
(74) *Attorney, Agent, or Firm* — Banner & Witcoff, Ltd.

(57) ABSTRACT

A threaded connection for steel pipes having improved sealing performance is provided. A threaded connection (10) for steel pipes includes a pin (10) and a box (20). The pin (10) includes a nose (11), a pin shoulder surface (12), a pin sealing surface (13) and a male thread (14). The box (20) includes a box shoulder surface (22), a box sealing surface (23) and a female thread (24). When the position of the portion of the pin sealing surface (13) that first contacts the inner periphery of the box (20) during make-up defines a seal position (P), the distance between the seal position (P) and the end of the male thread (14) adjacent to the pin sealing surface (13) as measured in the pipe-axis direction is denoted by x, and the distance between the tip of the pin (10) and the end of the male thread (14) adjacent to the pin sealing surface (13) as measured in the pipe-axis direction is denoted by L, then, x/L is not smaller than 0.4 and not larger than 0.55.

4 Claims, 6 Drawing Sheets

(56) References Cited

U.S. PATENT DOCUMENTS

| | | | |
|---|---|---|---|
| 3,870,351 A * | 3/1975 | Matsuki | E21B 17/08 285/334 |
| 4,984,829 A | 1/1991 | Saigo et al. | |
| 5,066,052 A * | 11/1991 | Read | F16L 15/004 285/334 |
| 5,964,486 A * | 10/1999 | Sinclair | F16L 15/004 285/331 |
| 2004/0108720 A1 * | 6/2004 | Mallis | F16L 15/007 285/334 |
| 2004/0262919 A1 * | 12/2004 | Dutilleul | E21B 17/042 285/333 |
| 2005/0248153 A1 * | 11/2005 | Sugino | F16L 15/004 285/333 |
| 2008/0191479 A1 * | 8/2008 | Suzuki | F16L 15/004 285/334 |
| 2008/0265575 A1 * | 10/2008 | Charvet-Quemin | F16L 15/004 285/331 |
| 2010/0270793 A1 * | 10/2010 | Takano | E21B 17/042 285/333 |
| 2010/0301603 A1 * | 12/2010 | Beigneux | F16L 15/004 285/390 |
| 2011/0025051 A1 * | 2/2011 | Yamaguchi | E21B 17/042 285/333 |
| 2011/0241340 A1 * | 10/2011 | Okada | E21B 17/042 285/333 |
| 2012/0119488 A1 * | 5/2012 | Hignett | F16L 15/004 285/328 |
| 2013/0181442 A1 * | 7/2013 | Sonobe | F16L 15/004 285/333 |
| 2015/0198270 A1 * | 7/2015 | Nagahama | E21B 17/042 285/390 |
| 2017/0298698 A1 * | 10/2017 | Branly | E21B 17/042 |
| 2018/0252342 A1 * | 9/2018 | Evans | E21B 17/042 |
| 2018/0258709 A1 * | 9/2018 | Yoneyama | E21B 17/042 |
| 2019/0093799 A1 * | 3/2019 | Sugino | F16L 15/04 |
| 2019/0330930 A1 * | 10/2019 | Oku | E21B 17/042 |
| 2020/0102797 A1 * | 4/2020 | Mencaglia | E21B 17/042 |
| 2020/0278056 A1 * | 9/2020 | Oku | E21B 17/042 |

FOREIGN PATENT DOCUMENTS

| | | |
|---|---|---|
| JP | 4535064 B2 | 9/2010 |
| JP | 2012-506000 A | 3/2012 |
| JP | 5776222 B2 | 9/2015 |
| WO | 2012056500 A1 | 5/2012 |
| WO | 2012118167 A1 | 9/2012 |
| WO | 2016059103 A1 | 4/2016 |

OTHER PUBLICATIONS

English Abstract & Family List of JP4535064B2.
English Abstract & Family List of JP5776222B2.
English Abstract & Family List of WO2012118167A1.
English Abstract & Family List of WO2016059103A1.

* cited by examiner

THREADED CONNECTION FOR STEEL PIPES

RELATED APPLICATION DATA

This application is a National Stage Application under 35 U.S.C. 371 of co-pending PCT application number PCT/JP2018/014616 designating the United States and filed Apr. 5, 2018; which claims the benefit of JP application number 2017-101229 and filed May 22, 2017 each of which are hereby incorporated by reference in their entireties.

TECHNICAL FIELD

The present disclosure relates to a threaded connection for steel pipes.

BACKGROUND ART

Steel pipes called oil country tubular goods (OCTGs) are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), geothermal power generation, or in hot springs. A threaded connection is used to connect OCTGs.

Such OCTG threaded connections are generally categorized as coupling type and integral type. A coupling-type connection connects a pair of pipes, one of which is an OCTG and the other one is a coupling. In this case, a male thread is provided on the outer periphery of each of the ends of the OCTG, while a female thread is provided on the inner periphery of each of the ends of the coupling. Then, the male thread of the OCTG is screwed into the female thread of the coupling such that they are made up and connected. An integral-type connection connects a pair of pipes that are both OCTGs, and does not use a separate coupling. In this case, a male thread is provided on the outer periphery of one end of each OCTG, while a female thread is provided on the inner periphery of the other end. Then, the male thread of one OCTG is screwed into the female thread of the other OCTG such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

A threaded connection is required to have good sealing performance against the pressure of fluid from the inside (hereinafter referred to as "internal pressure") and the pressure of fluid from the outside (hereinafter referred to as "external pressure"). In view of this, the threaded connection is provided with a seal using metal-to-metal contact. The seal is composed of a pin sealing surface and a box sealing surface that has a diameter slightly smaller than the diameter of the pin sealing surface. The difference between the diameter of the pin sealing surface and the diameter of the box sealing surface will be referred to as amount of seal interference. When the threaded connection is made up, the sealing surfaces has an interference fit, causing the diameter of the pin sealing surface to decrease and the diameter of the box sealing surface to increase. Each of the sealing surfaces tries to deform to their original diameters and thus produces an elastic recovery force, which causes the sealing surfaces to tightly contact with each other along the entire circumference, thereby providing sealing performance. At this time, the larger the amount of seal interference, the higher the contact pressure on the sealing surfaces, thus increasing sealing performance.

In recent years, numbers of deep wells being developed in severe environments with high pressure and high temperature have been increasing. Threaded connections used in such wells are required to have particularly good sealing performance.

One known threaded connection that provides good sealing performance is a threaded connection having a nose construction, such as that disclosed in Patent Document 1, for example. In the threaded connection of Patent Document 1, the pin includes a pin shoulder surface, a pin sealing surface and a male thread in this order, starting at the tip and going toward the OCTG body. The box includes a box shoulder surface, a box sealing surface and a female thread. The pin is provided with a nose. The nose is located between the pin shoulder surface and pin sealing surface. The outer periphery of the nose is not in contact with the box when the connection has been made up. The nose increases the stiffness of portions near the pin sealing surface. Thus, when an external pressure is applied to the threaded connection, the pin sealing surface is prevented from being deformed to reduce its diameter, which prevents the real amount of seal interference from decreasing, thereby improving the sealing performance against the external pressure.

Patent Document 2 also discloses a threaded connection having a nose construction. Patent Document 2 teaches that, where L is the length of the pin lip and x is the distance between the front end of the male thread and seal position, x/L is suitably 0.2 to 0.8. According to Patent Document 2, the seal position is the position on the outer peripheral surface of the pin lip that first contacts the box sealing surface during make-up of the connections.

The following prior art documents are incorporated herein by reference.

[Patent Document 1] Japanese Patent No. 4535064
[Patent Document 2] Japanese Patent No. 5776222

SUMMARY OF DISCLOSURE

The threaded connections of these patent documents attempt to improve sealing performance by means of a nose construction. Still, the sealing performance of these threaded connections can further be improved.

An object of the present disclosure is to provide a threaded connection for steel pipes having improved sealing performance.

A threaded connection for steel pipes according to the present disclosure includes a tubular pin and a tubular box. The pin is provided adjacent to a steel pipe body. The pin is inserted into the box such that the box and the pin are made up. The pin includes a nose, a pin shoulder surface, a male thread, and a pin sealing surface. The nose provides a tip portion of the pin. The pin shoulder surface is provided on a tip surface of the nose. The male thread is provided on an outer periphery of the pin and located closer to the steel pipe body than the nose. The pin sealing surface is provided on the outer periphery of the pin and located between the nose and the male thread. The box includes a box shoulder surface, a female thread, and a box sealing surface. The box shoulder surface is provided to correspond to the pin shoulder surface and located in an interior region of the box. The box shoulder surface is in contact with the pin shoulder surface when the connection has been made up. The female thread is provided to correspond to the male thread and located on an inner periphery of the box. The box sealing surface is provided to correspond to the pin sealing surface and located on the inner periphery of the box. The box sealing surface is in contact with the pin sealing surface when the connection has been made up. When the connection has been made up, an outer periphery of the nose faces the inner periphery of the box with a clearance present therebetween. The threaded connection satisfies $0.4 \leq x/L \leq 0.55$. Here, x is a distance between a seal position and the end of the male thread adjacent to the pin sealing surface as measured in the pipe-axis direction, the seal position being a position of the pin sealing surface that first contacts the inner periphery of the box during make-up, and L is a distance between the tip of the pin and the end of the male thread adjacent to the pin sealing surface as measured in the pipe-axis direction.

The present disclosure provides improved sealing performance to a threaded connection for steel pipes.

EMBODIMENTS FOR CARRYING OUT THE INVENTION

In the threaded connections described in the above-listed patent documents, when the connection has been made up, the pin shoulder surface and box shoulder surface come into contact with each other to form a shoulder, while the pin sealing surface and box sealing surface come into contact with each other to form a seal. A nose is located between the shoulder and the seal. As such, even when an excessive compression load is applied to the threaded connection to deform the shoulder, the seal is unlikely to be affected. This maintains good sealing performance.

The nose increases the stiffness of the seal. As such, even when an external pressure is applied to the threaded connection, the seal is unlikely to be deformed to reduce its diameter, thereby preventing the real amount of seal interference from decreasing. This provides good external-pressure sealing performance.

As discussed above, Patent Document 2 teaches that the parameter x/L is suitably in the range of 0.2 to 0.8. However, Patent Document 2 does not discuss the effects of having a value of x/L in the range of 0.2 to 0.8. Patent Document 2 only discloses examples of threaded connections with x/L=0.7. Moreover, these examples do not show that any effects can be obtained from x/L=0.7. The range of x/L taught in Patent Document 2 has no specific support.

The present inventors found out that a change in the value of x/L works to both improve and worsen external-pressure sealing performance. This suggests that the ultimate sealing performance depends on the balance between the magnitude of the influence of the value of x/L to improve sealing performance and the magnitude of the influence of the value of x/L to worsen sealing performance. A specific explanation of this will be given below with reference to FIG. 1.

Figure 1:
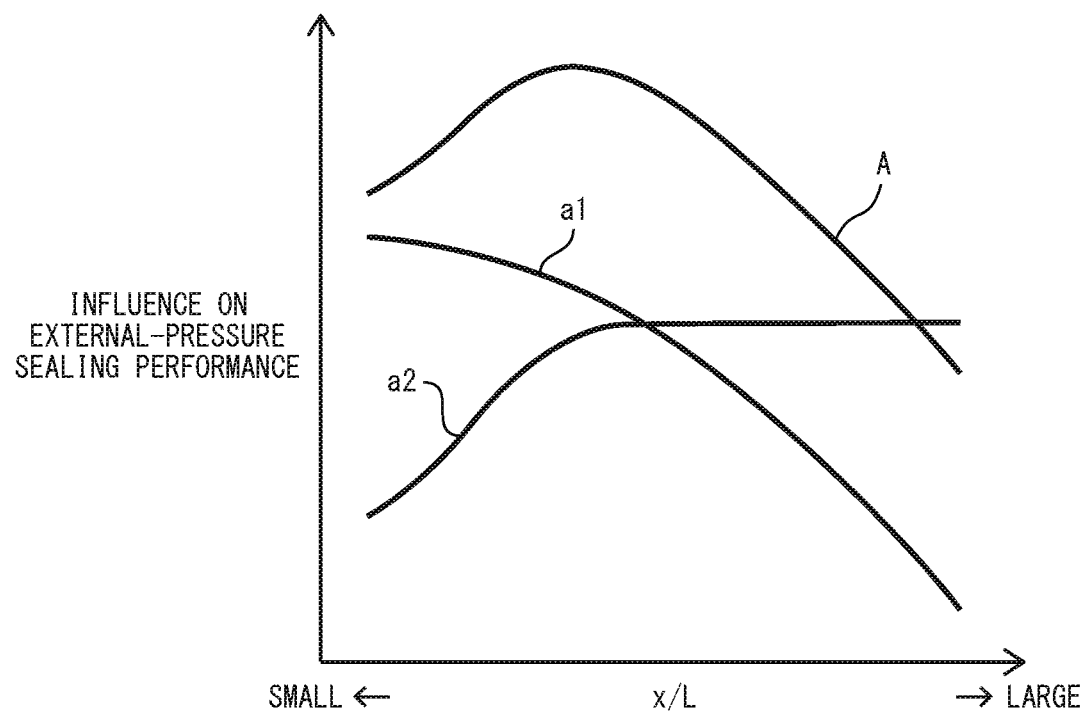
FIG. 1 is a graph schematically illustrating the relationship between the value of x/L and external-pressure sealing performance.

FIG. 1 is a graph schematically illustrating the relationship between the value of x/L and external-pressure sealing performance. Lines a1 and a2 in FIG. 1 each indicate the relationship between the value of x/L and external-pressure sealing performance, where factors responsible for improving external-pressure sealing performance and those responsible for worsening external-pressure sealing performance are treated separately. Line A in FIG. 1 is the sum of lines a1 and a2, and indicates the relationship between the value of x/L and the ultimate external-pressure sealing performance.

First, the relationship indicated by line a1 in FIG. 1 will be discussed.

As the value of x/L increases, the relative length of the nose in the pin lip becomes small. This decreases the stiffness of the seal. When the value of x/L is large, in the pin lip, the relative distance between the seal position and the front end of the male thread becomes large. That is, the seal position becomes far from the location of engagement of the threads such that, when an external pressure is applied, the seal is likely to be deformed to reduce its diameter. This is thought to be the reason why the external-pressure sealing performance worsens as the value of x/L increases, as indicated by line a1.

As the value of x/L decreases, the relative length of the nose becomes large and the relative distance between the seal position and the front end of the male thread becomes small. As such, the stiffness of the seal is improved, and the seal position becomes close to the location of engagement of the threads, thereby preventing the seal from being deformed to reduce its diameter. This is thought to be the reason why the external-pressure sealing performance is improved as the value of x/L decreases, as indicated by line a1.

Next, the relationship indicated by line a2 in FIG. 1 will be discussed.

As discussed above, as the value of x/L increases, the relative distance between the seal position and the front end of the male thread becomes relatively large. As such, the seal position becomes far from the location of engagement of the threads, which reduces the decrease in the real amount of interference at the seal caused by the interference between the threads. This is thought to be the reason why the external-pressure sealing performance is improved as the value of x/L increases, as indicated by line a2. It is assumed that, if the decrease in the real amount of interference at the seal caused by the interference between the threads is small, the internal-pressure sealing performance will be improved.

As the value of x/L decreases, the relative distance between the seal position and the front end of the male thread becomes small, and the seal position becomes close to the location of engagement of the threads. As such, the real amount of interference at the seal is likely to decrease due to the interference between the threads. Thus, the external-pressure sealing performance worsens as the value of x/L decreases, as indicated by line a2. It is assumed that the internal-pressure sealing performance worsens at the same time.

Thus, a change in the value of x/L affects the stiffness of the seal, the easiness with which the seal can be deformed to reduce its diameter, and the decrease in the real amount of interference of the seal. The ultimate sealing performance is determined by summing the influence of x/L upon the stiffness of the seal and the easiness with which the seal can be deformed to reduce its diameter (line a1) and the influence of x/L on the decrease in the real amount of interference of the seal (line a2), as indicated by line A in FIG. 1. The present inventors anticipated that there should be the optimum range of x/L for producing good ultimate sealing performance.

The present inventors did research to find the optimum range of x/L. The present inventors found that, if x/L is 0.4 or larger, the real amount of interference of the seal is hardly reduced by the interference between the threads, thereby providing good sealing performance, especially against the internal pressure.

The present inventors found that the external-pressure sealing performance tends to decrease as x/L increases. The present inventors found that, if x/L is 0.55 or smaller, the effect of the interference between the threads, of reduction of the decrease in the real amount of interference at the seal, is larger than the adverse effect of the decrease in the length of the nose, of reduction of the stiffness of the seal, thereby improving sealing performance, especially against the external pressure.

Based on the above-described findings, the present inventors made the threaded connections for steel pipes according to the embodiments.

A threaded connection for steel pipes according to an embodiment includes a tubular pin and a tubular box. The pin is provided adjacent to a steel pipe body. The pin is inserted into the box such that the box and the pin are made up. The pin includes a nose, a pin shoulder surface, a male thread, and a pin sealing surface. The nose provides a tip portion of the pin. The pin shoulder surface is provided on a tip surface of the nose. The male thread is provided on an outer periphery of the pin and located closer to the steel pipe body than the nose is. The pin sealing surface is provided on the outer periphery of the pin and located between the nose and the male thread. The box includes a box shoulder surface, a female thread, and a box sealing surface. The box shoulder surface is provided to correspond to the pin shoulder surface and located in an interior region of the box. The box shoulder surface is in contact with the pin shoulder surface when the connection has been made up. The female thread is provided to correspond to the male thread and located on an inner periphery of the box. The box sealing surface is provided to correspond to the pin sealing surface and located on the inner periphery of the box. The box sealing surface is in contact with the pin sealing surface when the connection has been made up. When the connection has been made up, an outer periphery of the nose faces the inner periphery of the box with a clearance present therebetween. The threaded connection satisfies 0.4≤x/L≤0.55. Here, x is a distance between a seal position and the end of the male thread adjacent to the pin sealing surface as measured in the pipe-axis direction, the seal position being a position of the pin sealing surface that first contacts the inner periphery of the box during make-up, and L is a distance between the tip of the pin and the end of the male thread adjacent to the pin sealing surface as measured in the pipe-axis direction (first arrangement).

In the first arrangement, x/L is not smaller than 0.4 and not larger than 0.55. If x/L is in the range of not smaller than 0.4 and not larger than 0.55, external-pressure sealing performance can be improved while maintaining good internal-pressure sealing performance. This will provide good sealing performance to the threaded connection.

Starting from the above-described threaded connection, a cross-sectional area of the pin as measured at the seal position may be 35% or larger of a cross-sectional area of the steel pipe body (second arrangement).

The second arrangement provides a sufficient cross-sectional area of the seal composed of the pin sealing surface and box sealing surface. This will maintain high stiffness of the pin lip. This will further improve external-pressure sealing performance.

The embodiments will now be described with reference to the drawings. The same and corresponding elements in the drawings are labeled with the same characters, and the same description will not be repeated. For ease of explanation, the drawings may show elements in a simplified or schematic manner, or may not show some elements.

First Embodiment

Figure 2:
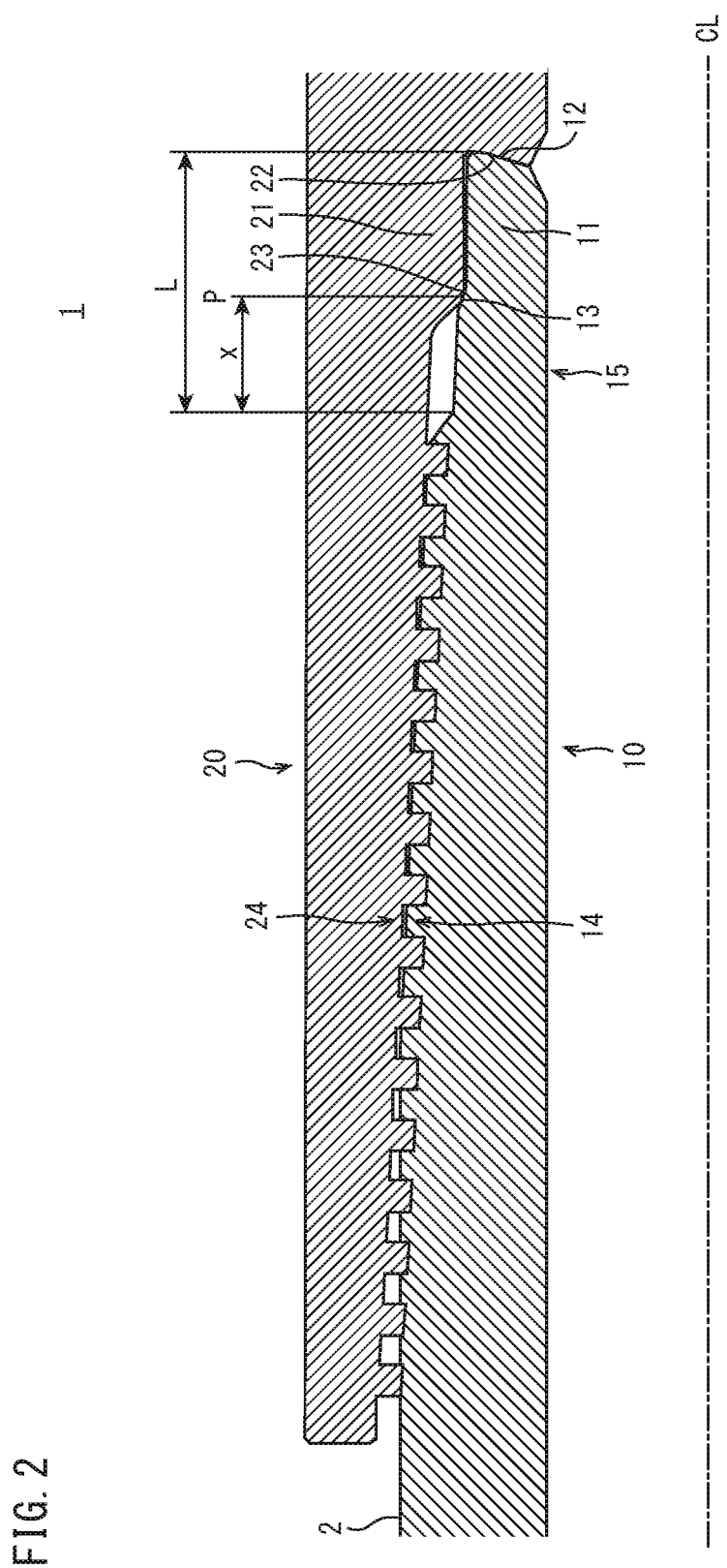
FIG. 2 is a schematic longitudinal cross-sectional view of a threaded connection for steel pipes according to a first embodiment.

FIG. 2 is a schematic longitudinal cross-sectional view of a threaded connection 1 for a steel pipe according to a first embodiment. Longitudinal cross section means a cross section taken along a plane containing the pipe axis CL of the threaded connection 1. Transverse cross section means a cross section taken along a plane perpendicular to the pipe axis CL. The present embodiment may be employed in an integral-type threaded connection, or may be employed in a coupling-type threaded connection.

As shown in FIG. 2, the threaded connection 1 includes a tubular pin 10 and a tubular box 20. The pin 10 is inserted into the box 20 such that the pin 10 and box 20 are made up.

The pin 10 is provided adjacent to the steel pipe body 2. The steel pipe body 2 is a portion of the steel pipe including the pin 10 that is not within the box 20 after insertion. The steel pipe may be a steel pipe, for example. In the following description, for ease of explanation, as determined along the pipe-axis direction of the pin 10, the direction toward the tip of the pin 10 may be referred to as forward direction or direction toward the front, and the direction toward the steel pipe body 2 may be referred to as rearward direction or direction toward the rear.

The pin 10 includes a nose 11, a pin shoulder surface 12, a pin sealing surface 13 and a male thread 14. The pin shoulder surface 12, nose 11, pin sealing surface 13 and male thread 14 are arranged in this order as it goes from the front toward the rear of the pin 10. The portion of the pin 10 that is located forward of the male thread 14 will be referred to as pin lip 15. The pin lip 15 includes the nose 11, pin shoulder surface 12 and pin sealing surface 13.

The nose 11 provides a tip portion of the pin 10. The nose 11 is cylindrical in shape. The outer peripheral surface of the nose 11 may have the shape corresponding to the outer peripheral surface of a cylinder or the shape corresponding to the outer peripheral surface of a truncated cone having an outer diameter that decreases as it goes toward the tip of the pin 10. The outer peripheral surface of the nose 11 may have the shape obtained by combining the outer peripheral surface of a cylinder and/or the outer peripheral surface of such a truncated cone and the outer peripheral surface of a solid of revolution obtained by rotating a curve such as an arc about the pipe axis CL.

The tip surface of the nose 11, i.e. the tip surface of the pin 10, includes a pin shoulder surface 12. The pin shoulder surface 12 forms a portion or all of the tip surface of the pin 10. The pin shoulder surface 12 is a toroidal surface disposed to cross the pipe-axis direction. The pin shoulder surface 12 is inclined relative to a plane perpendicular to the pipe axis CL such that its outer periphery is located forward of the inner periphery. The pin shoulder surface 12 may be substantially perpendicular to the pipe axis CL.

The pin sealing surface 13 is located closer to the steel pipe body 2 than the nose 11 is. The pin sealing surface 13 is located on the outer periphery of the pin 10. The pin sealing surface 13 is located adjacent to the nose 11.

The pin sealing surface 13 includes a taper surface and/or curved surface. For example, the pin sealing surface 13 has the shape corresponding to the outer peripheral surface of a truncated cone having an outer diameter that decreases as it goes toward the tip of the pin 10, or the shape corresponding to the outer peripheral surface of a solid of revolution obtained by rotating a curve such as an arc about the pipe axis CL. The pin sealing surface 13 may have the shape obtained by combining the outer peripheral surface of such a truncated cone and the peripheral surface of such a solid of revolution.

The outer peripheral surface of the pin lip 15 may be a single taper surface or may include a plurality of taper surfaces. In implementations where the outer peripheral surface of the pin lip 15 includes a plurality of taper surfaces, when the pin sealing surface 13 is generally formed by a taper surface, the outer peripheral surface of the nose 11 may be formed by a taper surface having a taper angle that is smaller (i.e. gentler) or larger (i.e. steeper) than the taper angle of the pin sealing surface 13.

According to the present embodiment, the outer peripheral surface of the pin lip 15 is formed by a plurality of taper surfaces. More specifically, the outer peripheral surface of the nose 11 is generally a taper surface. The pin sealing surface 13 is generally a taper surface. The taper angle of the outer peripheral surface of the nose 11 is smaller than the taper angle of the pin sealing surface 13. The slope of the outer peripheral surface of the pin lip 15 changes at the border between the nose 11 and pin sealing surface 13. The pin sealing surface 13 may be provided to the outer peripheral surface of the nose 11 via a curved surface.

The portion of the outer peripheral surface of the pin lip 15 that is located rearward of the pin sealing surface 13 is generally a taper surface having a smaller taper angle than the pin sealing surface 13. The slope of the outer peripheral surface of the pin lip 15 changes at the border between the rearward portion and the pin sealing surface 13. The pin sealing surface 13 may be provided to the rearward portion via a curved surface. Alternatively, the rearward portion and the pin sealing surface 13 may be a single taper surface.

The outer peripheral surface of the nose 11 and/or the portion of the outer peripheral surface of the pin lip 15 that is rearward of the pin sealing surface 13 may be formed by the outer peripheral surface of a cylinder.

In FIG. 2, the distance between the seal position P of the pin sealing surface 13 and the front end of the male thread 14 as measured in the pipe-axis direction is denoted by x, and the distance between the tip of the pin 10 and the front end of the male thread 14 as measured in the pipe-axis direction is denoted by L. The distance L is the length of the pin lip 15. Seal position P and distances x and L will be described in detail further below.

The male thread 14 is located rearward of the pin lip 15 as determined along the pipe-axis direction. The male thread 14 is provided on the outer periphery of the pin 10. The male thread 14 is constituted by a tapered thread.

The box 20 includes a nose-receiving portion 21, a box shoulder surface 22, a box sealing surface 23, and a female thread 24. In the following description, for ease of explanation, as determined along the pipe-axis direction of the box 20, the direction toward the pipe end of the steel pipe or coupling with the box 20 may be referred to as outward direction or direction toward the exterior, and the opposite direction may be referred to as inward direction or direction toward the interior. The box shoulder surface 22, nose-receiving portion 21, box sealing surface 23 and female thread 24 are arranged in this order as it goes from the interior toward the exterior of the box 20.

The nose-receiving portion 21 is a portion of the box 20 that corresponds to the nose 11 of the pin 10. The nose-receiving portion 21 provides an interior end portion of the box. When the connection has been made up, the inner periphery of the nose-receiving portion 21 faces the outer periphery of the nose 11, with a clearance present therebetween. That is, when the connection has been made up, the outer periphery of the nose 11 is not in contact with the inner periphery of the box 20.

The inner peripheral surface of the nose-receiving portion 21 is not limited to any particular shape. The inner peripheral surface of the nose-receiving portion 21 may be formed by the inner peripheral surface of a cylinder or may be formed by a taper surface having an inner diameter that decreases as it goes toward the interior of the box 20. The inner peripheral surface of the nose-receiving portion 21 may have the shape obtained by combining the inner peripheral surface of such a cylinder and/or such a taper surface and the inner peripheral surface of a solid of revolution obtained by rotating a curve such as an arc about the pipe axis CL.

The box shoulder surface 22 is provided to correspond to the pin shoulder surface 12 and located in the interior region of the box 20. Similar to the pin shoulder surface 12, the box shoulder surface 22 is a toroidal surface disposed to cross the pipe-axis direction.

When the connection has been made up, the box shoulder surface 22 is in contact with the pin shoulder surface 12 and, together with the pin shoulder surface 12, forms a shoulder. The pin and box shoulder surfaces 12 and 22 serve as a stop for limiting screw-in of the pin 10. The pin and box shoulder surfaces 12 and 22 serve to generate a thread-tightening axial force inside the connection.

The box sealing surface 23 is located outward of the nose-receiving portion 21 as determined along the pipe-axis direction. The box sealing surface 23 is provided to correspond to the pin sealing surface 13 and is located on the inner periphery of the box 20.

The pin sealing surface 13 and box sealing surface 23 have an amount of interference. That is, when the connection is not made up, the pin sealing surface 13 has a diameter that is slightly larger than the diameter of the box sealing surface 23. When the connection has been made up, the pin sealing surface 13 and box sealing surface 23 are in tight contact with each other by interference fit. When the connection has been made up, the pin sealing surface 13 and box sealing surface 23 form a seal by metal-to-metal contact.

The box sealing surface 23 may be shaped to protrude toward the pin sealing surface 13. Alternatively, the box sealing surface 23 may not protrude toward the pin sealing surface 13. It is only required that at least a portion of the box sealing surface 23 be capable of being in tight contact with the pin sealing surface when the connection has been made up. The box sealing surface 23 may be constructed to have various shapes.

The female thread 24 is provided to correspond to the male thread 14 and is provided on the inner periphery of the box 20. The female thread 24 is constituted by a tapered thread that engages the tapered thread constituting the male thread 14. When the connection has been made up, the female thread 24, together with the male thread 14, forms a thread assembly.

Each of the load flanks of the male thread 14 and female thread 24 has a flank angle smaller than 0°. Although not limiting, each of the male thread 14 and female thread 24 may be constituted by a trapezoidal thread. Each of the male thread 14 and female thread 24 is preferably constituted by a single-start thread or a double-start thread.

Figure 3:
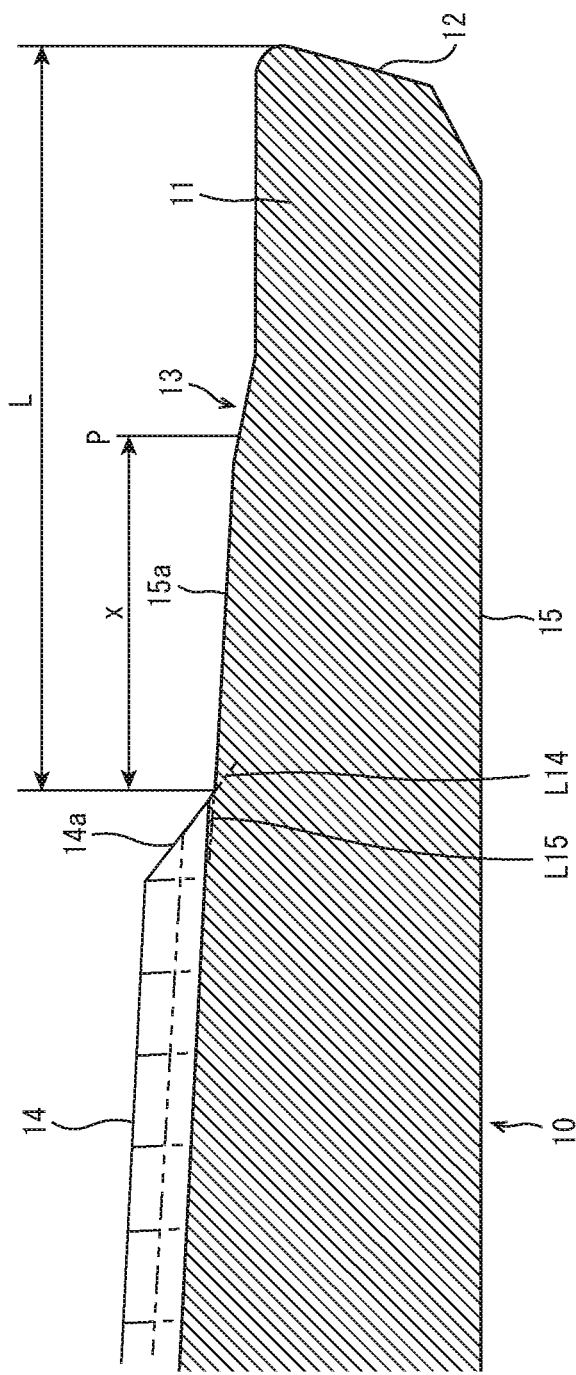
FIG. 3 is a longitudinal cross-sectional view of the tip portion of the pin of the threaded connection of FIG. 1.

FIG. 3 is an enlarged longitudinal cross-sectional view of the tip portion of the pin 10.

As shown in FIG. 3, in a longitudinal cross-sectional view of the pin 10, the thread crests of a front end portion of the male thread 14 are partially cut away to have an incomplete shape. These thread crests have a bevel 14a formed thereon, which is a slope inclined toward the tip and inner periphery of the pin 10. In a longitudinal cross-sectional view of the pin 10, the front end of the male thread 14 is defined as the intersection of a line L14 extending from the bevel 14a and a line L15 extending from a portion 15a of the outer periphery of the pin lip 15 that is adjacent to the bevel 14a.

Seal position P is the position of the portion of the pin sealing surface 13 that first contacts the inner peripheral surface of the box 20 (FIG. 2) during make-up. As discussed above, L is the distance between the apex of the pin 10 and the front end of the male thread 14 as measured in the pipe-axis direction. x is the distance between seal position P and the front end of the male thread 14 as measured in the pipe-axis direction.

According to the present embodiment, the length L of the pin lip 15 and the distance x between seal position P and the front end of the male thread 14 are such that the value of x/L falls within a predetermined range. More specifically, x/L is not smaller than 0.4 and not larger than 0.55, and preferably not smaller than 0.4 and smaller than 0.5. The value of length L and the value of distance x are values found when the connection is not made up.

The transverse cross section of the pin 10 as measured at seal position P is preferably not smaller than 35% of the transverse cross section of the steel pipe body 2 (FIG. 2), and more preferably not smaller than 50%. The upper limit of the transverse cross section of the pin 10 as measured at seal position P may be 70% of the transverse cross section of the steel pipe body 2, for example.

Second Embodiment

Figure 4:
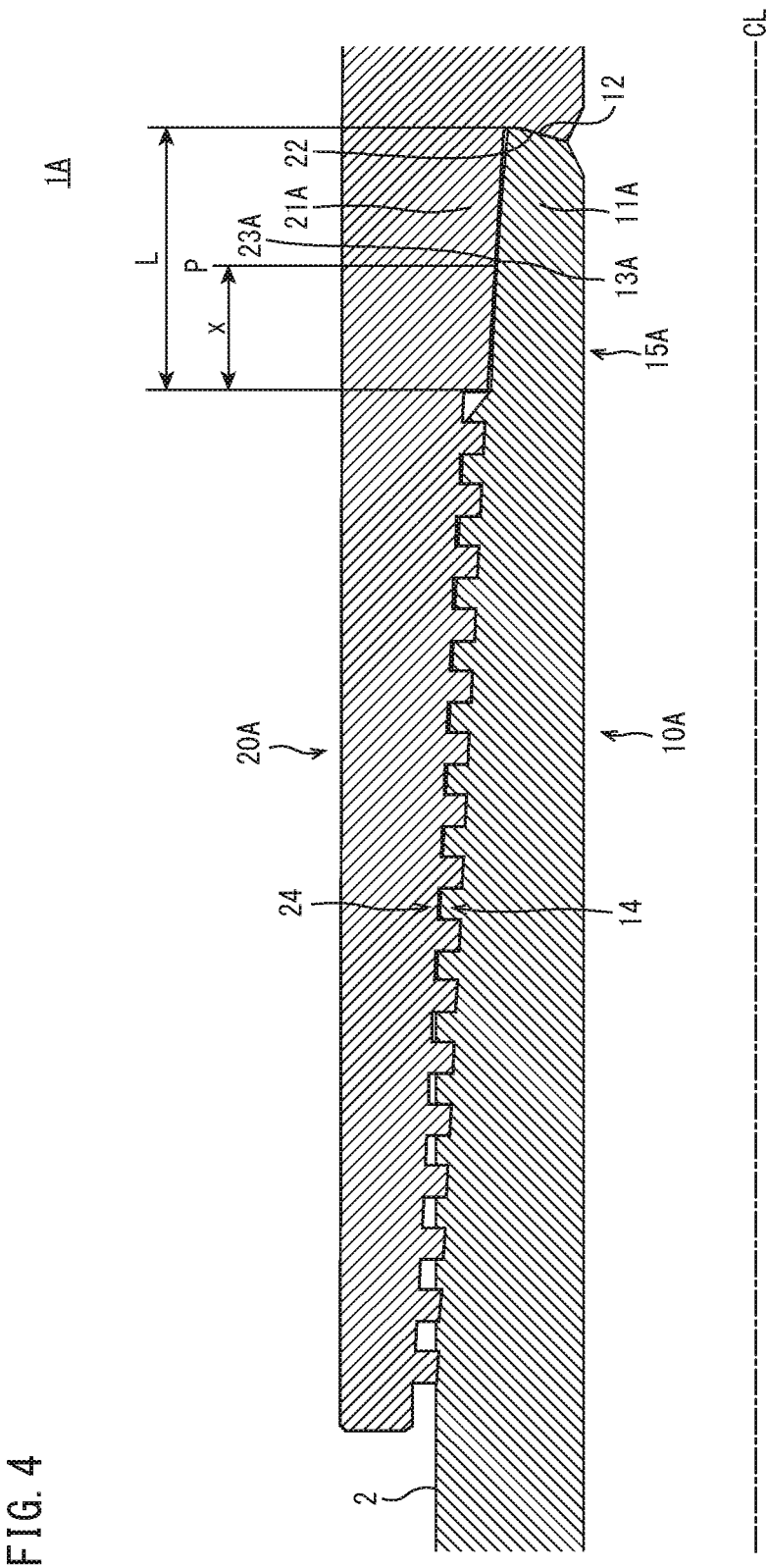
FIG. 4 is a schematic longitudinal cross-sectional view of a threaded connection for steel pipes according to a second embodiment.
Figure 5:
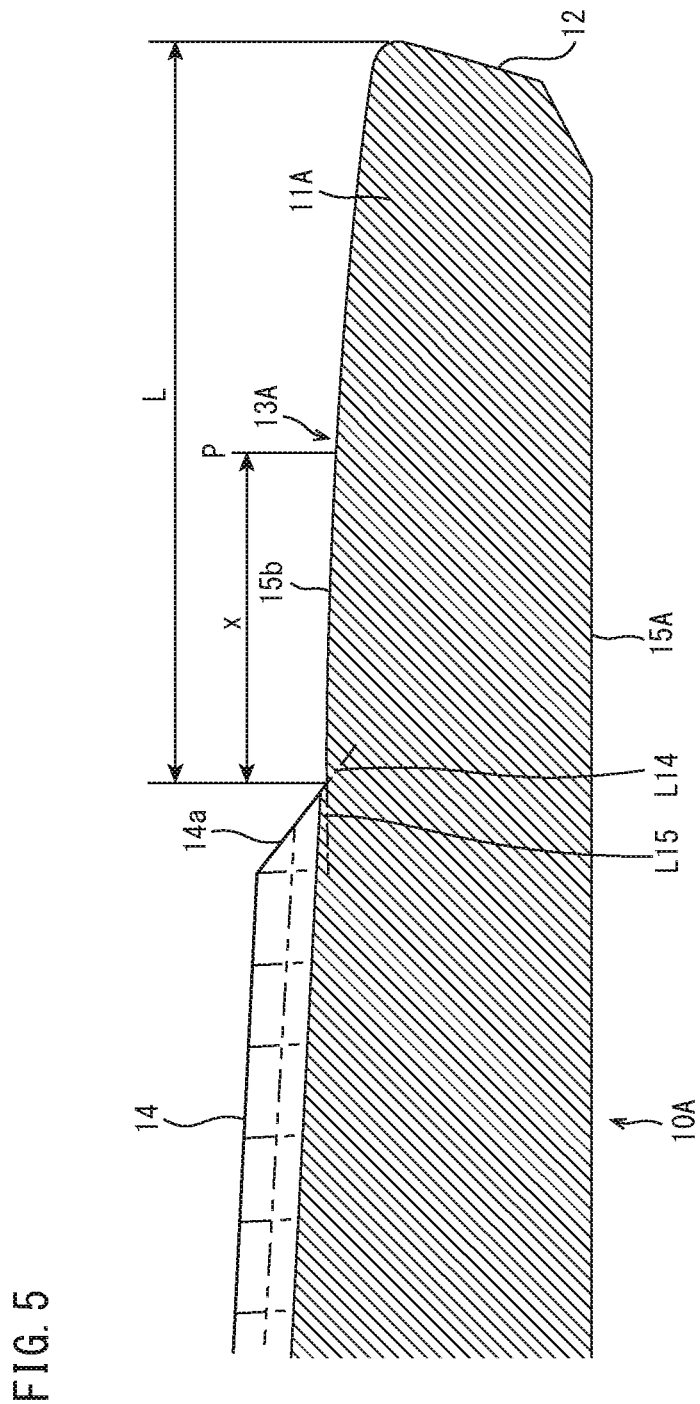
FIG. 5 is a longitudinal cross-sectional view of the tip portion of the pin of the threaded connection of FIG. 4.

FIG. 4 is a schematic longitudinal cross-sectional view of a threaded connection 1A for a steel pipe according to a second embodiment. FIG. 5 is an enlarged longitudinal cross-sectional view of the tip portion of the pin 10A of the threaded connection 1A. The threaded connection 1A may be an integral-type threaded connection, or may be a coupling-type threaded connection.

The threaded connection 1A according to the present embodiment has the same construction as the threaded connection 1 according to the first embodiment except for the pin lip 15A and the portion of the box 20A that corresponds to the pin lip 15A. In the context of the present embodiment, description will be focused on the differences between the present embodiment and first embodiment.

As shown in FIGS. 4 and 5, the outer peripheral surface of the pin lip 15A is constituted by a convex curved surface 15b. That is, the outer peripheral surface of the pin lip 15A is a curved surface protruding toward the box 20A. The outer peripheral surface of the pin lip 15A is a smooth continuous surface whose curvature does not change rapidly over the entire surface. The outer peripheral surface of the pin lip 15A may be a convex curved surface with a single curvature, or may include a plurality of curved surfaces.

As shown in FIG. 5, in a longitudinal cross-sectional view of the pin 10A, the thread crests of a front end portion of the male thread 14 are partially cut away to have an incomplete shape. These thread crests have a bevel 14a formed thereon, which is a slope inclined toward the tip and inner periphery of the pin 10. In a longitudinal cross-sectional view of the pin 10, the front end of the male thread 14 is defined as the intersection of a line L14 extending from the bevel 14a and a line L15 extending from the convex curved surface 15b on the outer periphery of the pin lip 15.

The portion of the inner peripheral surface of the box 20A that corresponds to the pin lip 15A is shaped to correspond to the outer peripheral surface of the pin lip 15A. That is, the portion of the inner peripheral surface of the box 20A that corresponds to the pin lip 15A is shaped in such a manner that, when the connection has been made up, the box sealing surface 23A is in contact with the pin sealing surface 13A and the nose-receiving portion 21A is not in contact with the nose 11A.

The box sealing surface 23A has a taper surface. However, the box sealing surface 23A is not limited to such a shape. Again, the box sealing surface 23A may have various shapes.

Similar to the first embodiment, in the threaded connection 1A according to the present embodiment, x/L is not smaller than 0.4 and not larger than 0.55, and preferably not smaller than 0.4 and smaller than 0.5.

The transverse cross section of the pin 10A as measured at seal position P is preferably not smaller than 35% of the transverse cross section of the steel pipe body 2 (FIG. 4), and more preferably not smaller than 50%. The upper limit of the transverse cross section of the pin 10A as measured at seal position P may be 70% of the transverse cross section of the steel pipe body 2, for example.

Effects of Embodiments

As discussed above, as the value of x/L increases, the relative length of the nose 11, 11A becomes smaller such that the stiffness of the seal is more likely to decrease, and the relative distance between the location of engagement of the threads and the seal becomes larger such that the seal is more likely to be deformed to reduce its diameter. On the other hand, as the value of x/L increases, decrease in the real amount of interference at the seal due to the interference of the threads is less likely. That is, if the value of x/L is large, considerations of the stiffness of the seal and the deformation of the seal with reduced diameter suggest that external-pressure sealing performance will worsen, while considerations of the real amount of interference at the seal suggest that external-pressure sealing performance and internal-pressure sealing performance will be improved.

When the value of x/L becomes smaller, decrease in the stiffness of the seal and the deformation of the seal with reduced diameter are less likely; however, decrease in the real amount of interference at the seal due to the interference of the threads is more likely. When the value of x/L is small, considerations of the stiffness of the seal and the deformation of the seal with reduced diameter suggest that external-pressure sealing performance will be improved, while considerations of the real amount of interference at the seal suggest that external-pressure sealing performance and internal-pressure sealing performance will worsen.

Thus, a change in the value of x/L work both to improve and worsen sealing performance. The ultimate sealing performance depends on how to balance the influence of the value of x/L to improve sealing performance and the influence of the same value to worsen sealing performance.

When x/L is smaller than 0.4, the distance x between the front end of the male thread 14 and seal position P becomes small, which means that the distance between the threads and seal is small such that the interference of the threads causes the real amount of interference of the seal to decrease. When x/L is smaller than 0.4, the influence of the interference of the threads to decrease the real amount of interference of the seal is large, and thus sealing performance, especially against the internal pressure, decreases.

If x/L is larger than 0.55, the influence of the decrease in the relative length of the nose 11, 11A to reduce the stiffness of the seal, as well as the influence of the increased distance of the seal from the location of engagement of the threads to facilitate deformation of the seal with reduced diameter, becomes large. Thus, sealing performance, especially against the external pressure, worsens.

The threaded connections 1 and 1A according to the embodiments are each constructed such that x/L is not smaller than 0.4 and not larger than 0.55. This suitably balances the influence of the value of x/L to improve sealing performance and the influence of the same value to worsen sealing performance, thereby improving both external-pressure sealing performance and internal-pressure sealing performance.

In each of the threaded connections 1 and 1A according to the embodiments, the transverse cross section of the pin 10, 10A as measured at seal position P is preferably not smaller than 35% of the transverse cross section of the steel pipe body 2. This will provide sufficient transverse cross section of the seal, thereby maintaining high stiffness of the pin lip 15, 15A. This will further improve external-pressure sealing performance.

If the stiffness of the seal is too high, it is highly likely that galling will occur during make-up. To prevent galling during make-up, in each of the threaded connections 1 and 1A according to the embodiments, the transverse cross section of the pin 10, 10A as measured at position P is preferably not larger than 70% of the transverse cross section of the steel pipe body 2.

While embodiments have been described, the present disclosure is not limited to the above-described embodiments, and various modifications are possible without departing from the spirit of the disclosure.

To verify the effects of the threaded connection for steel pipes according to the present disclosure, numerical simulation analyses using the elasto-plastic finite element method were conducted.

[Test Conditions]

Finite element analyses were conducted for a plurality of samples with different values of the parameter x/L and the differences in performance were compared. Each sample was a coupling-type threaded connection having the basic construction shown in FIG. 1. The common test conditions are as follows:

(1) Size of Steel Pipe

7"×29 # (outer diameter: 177.8 mm; wall thickness: 10.4 mm)

(2) Grade of Steel Pipe

P110 in accordance with the API standards (i.e. carbon steel with a nominal yield stress of 110 ksi)

(3) Size of Threads (Common to all Threads)

Thread pitch: 5.08 mm; flank angle of load flank: −3'; flank angle of stab flank: 10'; stab-flank clearance: 0.15 mm For finite element analyses, sample models were used where the material was an isotropic-hardening elasto-plastic material with an elastic modulus of 210 GPa and a yield strength of 110 ksi (758.3 MPa), expressed as 0.2% proof stress.

[Evaluation Method]

After the tightening of the threads of each sample was analyzed, a load simulating that of the ISO13679 CAL4 Series A test was applied, and the sealing performances against the external pressure and the internal pressure were evaluated. Each of the sealing performances against the internal and external pressures was evaluated using the minimum contact force per unit length in the circumferential direction of the seal during the internal-pressure cycle of the load history (first and second quadrants) or the external-pressure cycle of the load history (third and fourth quadrants). The greater the minimum contact force, the better the sealing performance is.

Figure 6:
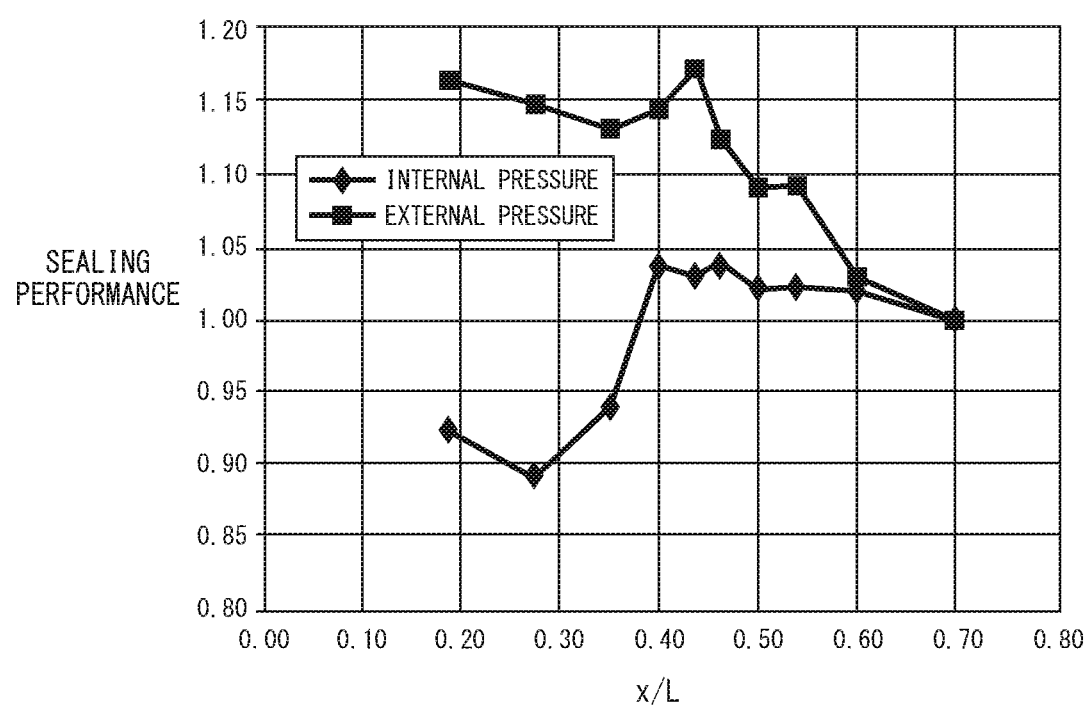
FIG. 6 is a graph illustrating the relationship between the value of x/L and sealing performance for threaded connections according to inventive and comparative examples.

Table 1 shows the test conditions and evaluations for the samples. FIG. 6 is a graph where the values of x/L for the samples and the sealing performances against the internal and external pressures are plotted.

TABLE 1

| | Pipe size | | | Sealing performance | | | |
| | Outer | Wall | | (contact force) | | | |
| Sample | diameter [mm] | thickness [mm] | x/L | Internal-pressure cycle | External-pressure cycle | Evaluation | Remarks |
| --- | --- | --- | --- | --- | --- | --- | --- |
| #1 | 177.8 | 10.4 | 0.19 | 0.92 | 1.16 | poor | comp. |
| #2 | 177.8 | 10.4 | 0.27 | 0.89 | 1.15 | poor | comp. |
| #3 | 177.8 | 10.4 | 0.35 | 0.94 | 1.13 | poor | comp. |
| #4 | 177.8 | 10.4 | 0.40 | 1.04 | 1.14 | excellent | inv. |
| #5 | 177.8 | 10.4 | 0.43 | 1.03 | 1.17 | excellent | inv. |
| #6 | 177.8 | 10.4 | 0.46 | 1.04 | 1.12 | excellent | inv. |
| #7 | 177.8 | 10.4 | 0.50 | 1.02 | 1.09 | good | inv. |
| #8 | 177.8 | 10.4 | 0.54 | 1.02 | 1.09 | good | inv. |
| #9 | 177.8 | 10.4 | 0.60 | 1.02 | 1.03 | poor | comp. |
| #10 | 177.8 | 10.4 | 0.70 | 1.00 | 1.00 | poor | comp. |

Sealing performance was evaluated using the following three levels based on relative values where the performance of sample #10 (x/L=0.7) is 1.00.

Excellent: the contact force during the internal-pressure cycle (internal-pressure sealing performance) is 1.00 or greater and the contact force during the external-pressure cycle (external-pressure sealing performance) is 1.10 or greater;

Good: the internal-pressure sealing performance is 1.00 or greater and the external-pressure sealing performance is 1.05 or greater; and Poor: the internal-pressure sealing performance is smaller than 1.00 or the external-pressure sealing performance is smaller than 1.05.

Samples #4 to 8 are inventive examples that fall within the scope of the present disclosure, while samples #1 to 3 and 9 to 10 are comparative examples that fall outside the scope of the present disclosure. That is, for samples #4 to 8, x/L was not smaller than 0.4 and not larger than 0.55, and for samples #1 to 3 and 9 to 10, x/L was smaller than 0.4 or larger than 0.55.

As shown in Table 1 and FIG. 6, for samples #1 to 3, x/L was smaller than 0.4, and thus the distance between the thread assembly and seal was small such that the interference between the threads caused a decrease in the real amount of interference at the seal. Thus, for samples #1 to 3, the internal-pressure sealing performance was smaller than 1.00 and was not good.

As shown in Table 1 and FIG. 6, for samples #4 to 8, x/L was not smaller than 0.4, and thus the distance between the thread assembly and seal was sufficiently large such that the interference between the threads caused no decrease in the real amount of interference at the seal. Thus, for samples #4 to 8, the internal-pressure sealing performance was not smaller than 1.00, and was good.

Further, for samples #4 to 8, x/L was not larger than 0.55 such that the threads sufficiently engaged each other near the seal, and thus the seal did not easily reduce its diameter even when the external pressure was applied. Thus, for samples #4 to 8, the external-pressure sealing performance was not smaller than 1.05, and was good.

Samples #4 to 6, where x/L was not smaller than 0.4 and smaller than 0.5, provided particularly good external-pressure sealing performance. For samples #4 to 6, the external-pressure sealing performance was not smaller than 1.10, which was very good.

As shown in Table 1 and FIG. 6, for samples #9 to 10, x/L was larger than 0.55, and thus the distance between the thread assembly and seal was sufficiently large such that the interference between the threads caused no decrease in the real amount of interference at the seal. Thus, samples #9 to 10 had no significant problem in terms of internal-pressure sealing performance.

However, for samples #9 to 10, where x/L was larger than 0.55, the distance between the seal and the location of engagement of the threads was large such that the seal tended to be deformed to reduce its diameter when the external pressure was applied. Thus, for samples #9 to 10, the external-pressure sealing performance was smaller than 1.05, which was not good.

This shows that, when x/L is not smaller than 0.4 and not larger than 0.55, good sealing performance can be achieved against both the external and internal pressures. This also shows that, when x/L is not smaller than 0.4 and smaller than 0.5, particularly good external-pressure sealing performance can be achieved.

The invention claimed is:

1. A threaded connection for steel pipes, comprising:
a steel pipe body having an outer diameter not smaller than 177.8 mm,
a tubular pin provided adjacent to the steel pipe body; and
a tubular box, the pin being inserted into the box such that the box and the pin are made up,
the pin including:
a nose providing a tip portion of the pin;
a pin shoulder surface provided on a tip surface of the nose;
a male thread provided on an outer periphery of the pin and located closer to the steel pipe body than the nose; and
a pin sealing surface provided on the outer periphery of the pin and located between the nose and the male thread,
the box including:
a box shoulder surface provided to correspond to the pin shoulder surface and located in an interior region of the box, the box shoulder surface being in contact with the pin shoulder surface when the connection has been made up;
a female thread provided to correspond to the male thread and located on an inner periphery of the box; and
a box sealing surface provided to correspond to the pin sealing surface and located on the inner periphery of the box, the box sealing surface being in contact with the pin sealing surface when the connection has been made up,
wherein, when the connection has been made up, an outer periphery of the nose faces the inner periphery of the box with a clearance present therebetween, and,
the threaded connection satisfies $0.4 \le x/L \le 0.55$, where x is a distance between a seal position and the end of the male thread adjacent to the pin sealing surface as measured in the pipe-axis direction, the seal position being a position of the pin sealing surface that first contacts the inner periphery of the box during make-up, and L is a distance between the tip of the pin and the end of the male thread adjacent to the pin sealing surface as measured in the pipe-axis direction.

2. The threaded connection for steel pipes according to claim 1, wherein a cross-sectional area of the pin as measured at the seal position is 35% or larger of a cross-sectional area of the steel pipe body.

3. The threaded connection for steel pipes according to claim 1, wherein the pin sealing surface is formed by a taper surface, and
an outer peripheral surface of the nose is formed by a taper surface having a taper angle that is smaller than a taper angle of the pin sealing surface.

4. A threaded connection for steel pipes, comprising:
a tubular pin provided adjacent to a steel pipe body; and
a tubular box, the pin being inserted into the box such that the box and the pin are made up,
the pin including:
a nose providing a tip portion of the pin;
a pin shoulder surface provided on a tip surface of the nose;
a male thread provided on an outer periphery of the pin and located closer to the steel pipe body than the nose; and
a pin sealing surface provided on the outer periphery of the pin and located between the nose and the male thread,
the box including:
a box shoulder surface provided to correspond to the pin shoulder surface and located in an interior region of the box, the box shoulder surface being in contact with the pin shoulder surface when the connection has been made up;
a female thread provided to correspond to the male thread and located on an inner periphery of the box; and
a box sealing surface provided to correspond to the pin sealing surface and located on the inner periphery of the box, the box sealing surface being in contact with the pin sealing surface when the connection has been made up,
wherein the pin sealing surface is formed by a taper surface,
an outer peripheral surface of the nose is formed by a taper surface having a taper angle that is smaller than a taper angle of the pin sealing surface,
when the connection has been made up, an outer periphery of the nose faces the inner periphery of the box with a clearance present therebetween, and,
the threaded connection satisfies $0.4 \le x/L \le 0.55$, where x is a distance between a seal position and the end of the male thread adjacent to the pin sealing surface as measured in the pipe-axis direction, the seal position being a position of the pin sealing surface that first contacts the inner periphery of the box during make-up, and L is a distance between the tip of the pin and the end of the male thread adjacent to the pin sealing surface as measured in the pipe-axis direction.

* * * * *